United States Patent
Heitz et al.

(10) Patent No.: US 6,579,947 B2
(45) Date of Patent: *Jun. 17, 2003

(54) HYDRAULIC FRACTURING FLUID COMPRISING A BLOCK COPOLYMER CONTAINING AT LEAST ONE WATER-SOLUBLE BLOCK AND ONE HYDROPHOBIC BLOCK

(75) Inventors: Caroline Heitz, Enghien les Bains (FR); Mathieu Joanicot, Lawrenceville, NJ (US); Robert J. Tillotson, Toms River, NJ (US)

(73) Assignee: Rhodia Chimie, Boulogne Billancourt Cedex (FR)

( * ) Notice: Subject to any disclaimer, the term of this patent is extended or adjusted under 35 U.S.C. 154(b) by 97 days.

This patent is subject to a terminal disclaimer.

(21) Appl. No.: 09/788,712

(22) Filed: Feb. 20, 2001

(65) Prior Publication Data

US 2002/0161087 A1 Oct. 31, 2002

(51) Int. Cl.$^7$ .................. C08F 293/00; C08F 295/00; C08L 95/00

(52) U.S. Cl. .............. 525/244; 525/259; 525/263; 524/505; 524/824; 524/71

(58) Field of Search ............... 525/244, 259, 525/263; 524/505, 824, 71

(56) References Cited

U.S. PATENT DOCUMENTS

| | | | |
|---|---|---|---|
| 4,835,211 A | | 5/1989 | Noda et al. ............. 526/312 |
| 6,111,025 A | * | 8/2000 | Visger et al. ............. 525/244 |
| 2001/0034428 A1 | * | 10/2001 | Destarac et al. ......... 526/303.1 |

FOREIGN PATENT DOCUMENTS

| WO | WO 01/16187 | 3/2001 | ............. C08F/8/12 |
|---|---|---|---|

OTHER PUBLICATIONS

U.S. patent application Ser. No. 09/387,487, Reeb, filed Sep. 1, 1999.

* cited by examiner

*Primary Examiner*—James J. Seidleck
*Assistant Examiner*—Olga Asinovsky

(57) ABSTRACT

The invention relates to a hydraulic fracturing fluid comprising an aqueous liquid, and a block copolymer containing at least one water-soluble block and one hydrophobic block and being particularly suited for use in high temperature ranges, greater than 180° C.

28 Claims, No Drawings

HYDRAULIC FRACTURING FLUID COMPRISING A BLOCK COPOLYMER CONTAINING AT LEAST ONE WATER-SOLUBLE BLOCK AND ONE HYDROPHOBIC BLOCK

The present invention relates to a hydraulic fracturing fluid comprising a block copolymer containing at least one water-soluble block and one hydrophobic block.

It is well known that production in petroleum, natural gas and geothermal wells can be greatly enhanced by hydraulic fracturing techniques. These techniques are known in the art and generally comprise introducing an aqueous solution of a water-soluble polymer (e.g. Guar Gum) in which "proppants" (e.g. coarse sand or sintered bauxite or synthetic ceramic materials) are suspended, through the well bore under extremely high pressures into the rock structure in which the petroleum, gas or steam is entrained. Minute fissures in the rock are thereby created and held open by the suspended particles after the liquid has drained off. The petroleum, gas or steam can then flow through the porous zone into the well. Examples of art relative to to fracturing techniques are U.S. Pat. Nos. 6,169,058, 3,974,077, and 3,888,312.

Polysaccharides, e.g. guar and guar derivatives, are the most commonly used water-soluble polymers for hydraulic fracturing. Examples of art relative to guar are U.S. Pat. Nos. 5,697,444, 5,305,837, and 5,271,466. Viscoelastic gels are formed by the chemical linking or cross-linking of the guar polymer chains. The result is a more ordered network structure which increases the effective molecular weight and thereby, the viscosity[(1)]. Surfactants and synthetic polymers have also been described in patent literature and are employed as gelling agents in fracturing fluids, when present in sufficient concentration to produce stable high viscosity viscoelastic gels. Examples of art relative to surfactants and synthetic polymers are U.S. Pat. Nos. 5,551,516, 6,013,185 6,004,466 and International Pat. WO/056497.

The viscosity stability of the various water-soluble polymer solutions, as a function of time and temperature, is crucial for successful hydraulic fracturing applications in the oil field area. They must retain sufficient suspension properties to deliver and place the proppant effectively to the targeted propagating fissure area, under typical high pressure and temperature conditions which are present down hole in the well bore. The fracturing process itself is relatively short lived, running typically from a few hours, but sometimes for a longer period in severe cases.

There are other important characteristics which must be met for a successful fracturing operation. The fracturing fluid must maintain sufficient proppant suspension and transport properties under a complex combination of rheological conditions presented by pressure, shear rate and temperature changes as the fracturing fluid is transported from the mixing stage, down through the well bore and into the propagating fractured rock fissures. It is necessary that the fluid exhibit predictable shear thinning and friction reduction properties in order the effectively transport it long distances down through the well bore at higher shear. Once in the propagating fissure area the fluid will encounter low shear under high pressure and temperature conditions. This is where its suspension properties are critical to ensure proper proppant packing within the fissure, with minimal dropout or settling of the proppant, which could cause an ineffective fracture once the pressure is released.

In addition to the Theological challenges under varying shear, pressure and temperature, the fluid is also exposed to a variety of chemical conditions which are dependent on the formation composition at the particular well site. These include pH (acidic or alkaline materials), brine (salt content), hardness (mineral content), crude oil and natural gas variations, which the fluid will contact and absorb as it travels through the propagating fracture.

The last major consideration is formation damage, once the fractured fissure has been completed and the proppant is properly placed. Great effort is made to remove as much of the gel-fluid component as possible, in order to reduce the amount of residue (polymeric or surfactant) left behind in the formation and proppant channel areas. A portion of it will naturally "leak-off" into the surrounding formation during the fracture process. This residue can reduce the effectiveness of the efficiencies gained by the fracturing process, by creating blockages in the minute porosity present in the fractured fissure face and channel. This is generally known as formation damage. It is desirable to minimize this condition in order to maximize the well production gain from the fracturing process. It is common to employ enzymatic or chemical "breakers" (example of that art: U.S. Pat. No. 5,697,444) when working with guar gels to depolymerize the polymer, which lowers the viscosity and allows a higher recovery of the fluid back through the well bore, although an amount of residual polymer is left behind. Surfactant systems most commonly known, rely on contact with the formation hydrocarbon (crude oil or liquefied gas) as a natural breaking mechanism to lower viscosity. Claims are made that this type of system leaves virtually no residue behind in the formation. The Industry generally refers to the term "permeability" to describe relative formation damage. A value of 100% return-permeability would denote that the formation permeability is equal to its original value, before exposure to a fracturing polymer or surfactant. A lower number would denote a reduction in formation permeability (formation damage) caused by polymer residue. In practice, the best traditional guar system cleanup will result in a maximum of 75% permeability, while surfactant systems claim values of 95–100%. The industry also uses the term "conductivity" to denote the relative permeability of the proppant filled fissure area, following a fracture job One of the essential objectives of the present invention is to provide a fracturing fluid whose viscosity is stable as high temperatures as 190° C., preferably 200° C. and even higher.

Another objective of the invention is to provide a fracturing fluid with sufficient proppant suspension and transport properties.

Another objective of the invention is to provide a fracturing fluid causing no or almost no formation damage.

Another objective of the invention is to provide a fracturing fluid still efficient when exposed to a variety of chemical conditions.

These objectives and others which will appear subsequently, are attained by means of a hydraulic fracturing fluid comprising a block copolymer containing at least one block water-soluble in nature and at least one block predominantly hydrophobic in nature. More precisely, the invention relates to a hydraulic fracturing fluid composition comprising:

a) an aqueous liquid, and
b) a block copolymer comprising at least one block water-soluble in nature and containing hydrophobic units and at least one block predominantly hydrophobic in nature forming a viscoelastic gel in said aqueous liquid.

According to a first embodiment, the copolymer contains only a single hydrophobic block and a single water-soluble block. According to another embodiment, the copolymer contains a water-soluble block having a hydrophobic group at each end or the copolymer contains a hydrophobic block having a water-soluble group at each end.

In the description which follows, the expression "block water-soluble in nature" should be understood to mean a polymer block containing a number of hydrophilic groups sufficient to obtain a water soluble block well dissolved in water. Solubility in water of the water soluble block means a block copolymer containing such a water soluble block, when mixed with water, gives a translucent monophasic system. Usually such a translucent monophasic system is obtained from a water soluble block comprising at least 30%, preferably at least 50% by weight of hydrophilic units with respect to the totality of units of the water-soluble block. The block water-soluble in nature is therefore soluble in water. The term "unit" should be understood to mean that part of the block corresponding to a monomeric unit.

Likewise, the expression "block predominantly hydrophobic in nature" should be understood to mean a polymer block preferably containing at least 67% by weight hydrophobic units with respect to the totality of units. The block predominantly hydrophobic in nature is not soluble in water. This block copolymer containing at least one block water-soluble in nature and at least one block predominantly hydrophobic in nature forms a viscoelastic gel when it is in solution in water.

The term "viscoelastic gel" should be understood to mean a liquid medium for which the viscous modulus G" and the elastic modulus G' are such that G'>G". This gel behaviour is manifested by a flow threshold and even, in some cases, by a shear-thickening effect (an increase in the viscosity with flow). This gel effect is obtained when the polymer concentration exceeds a certain threshold called the critical gelling concentration.

The block copolymers according to the present invention have the advantage of making the aqueous media viscoelastic when they are used in only a small amount with respect to the aqueous medium. The copolymer may be used at in said hydraulic fluid at a concentration higher than 0.1% by weight, more particularly between 0.5 and 10% by weight and even more preferably at a concentration from 1 to 5% by weight.

The appropriate viscoelastic properties of the copolymers according to the present invention may be obtained by selecting the nature of the soluble blocks and the nature of the predominantly hydrophobic blocks, at least the hydrophilic block having to contain hydrophobic groups in an appropriate amount.

According to one embodiment of the invention, the weight ratio of the block water-soluble in nature to the completely hydrophobic block is between 95/5 and 20/80, even more preferably between 90/10 and 40/60.

According to a first version of the preparation, the blocks water-soluble in nature and the blocks predominantly hydrophobic in nature of the above copolymers may come from the copolymerization of hydrophilic and hydrophobic monomers. The amounts of hydrophilic and hydrophobic units in each of said blocks can then be controlled by the respective contents of hydrophilic monomers and hydrophobic monomers during the polymerization of the blocks.

Thus, the blocks predominantly hydrophobic in nature may come from the copolymerization of hydrophobic monomers and of hydrophilic monomers, the hydrophilic monomers being present in an amount of less than 33% by weight, preferably at least 1% by weight, even more preferably between 2 and 15%, with respect to the total weight of the units of the hydrophobic block.

In addition, the blocks water-soluble in nature may come from the copolymerization of hydrophilic monomers and of hydrophobic monomers, the hydrophobic monomers being present in an amount of less than 70% by weight, preferably at least 1% by weight, even more preferably between 50 and 10%, with respect to the total weight of the units of the water-soluble block.

According to a second version of the preparation, the blocks water-soluble in nature may come:

from the polymerization of monomers that may be rendered hydrophilic by hydrolysis and optionally of non-hydrolysable hydrophobic monomers and/or of hydrophilic monomers, and then from the hydrolysis of the polymer obtained.

During the hydrolysis, the units corresponding to the hydrolysable monomers are hydrolysed into hydrophilic units.

The amounts of hydrophilic and hydrophobic units in each of said blocks are then controlled by the amount of each type of monomer and by the degree of hydrolysis.

According to this second version, various methods of implementation may be envisaged.

According to a first method of implementation, the blocks may be obtained by:

homopolymerization of hydrophobic monomers that can be rendered hydrophilic by hydrolysis and partial hydrolysis of the homopolymer obtained to a degree such that what is obtained is:

either, in the case of the blocks predominantly hydrophobic in nature, an amount of hydrophilic units of less than 33% by weight, preferably at least 1% by weight, even more preferably between 2 and 15%, with respect to the total weight of the units of the hydrophobic block, or, in the case of the blocks water-soluble in nature, an amount of hydrophobic units of less than 70% by weight, preferably at least 1% by weight, even more preferably between 25 and 50%, with respect to the total weight of the units of the water-soluble block.

According to a second method of implementation, the blocks may be obtained by:

copolymerization of hydrophobic monomers that can be rendered hydrophilic by hydrolysis and of hydrophobic monomers that cannot be rendered hydrophilic by hydrolysis and then complete or partial hydrolysis of the polymer obtained.

According to this second method of implementation, the amount of hydrophilic and hydrophobic units may depend on two criteria, namely the content of the various types of monomers and the degree of hydrolysis.

If there is complete hydrolysis, it is sufficient to vary the content of the monomers and thus:

the blocks predominantly hydrophobic in nature can come:

from the polymerization of a mixture of hydrophobic monomers that can be rendered hydrophilic by hydrolysis and of hydrophobic monomers that cannot be rendered hydrophilic by hydrolysis, the hydrophobic monomers that can be rendered hydrophilic by hydrolysis being present in an amount of less than 33% by weight, preferably at least 1% by weight, even more preferably between 2 and 15%, with respect to the total weight of the units of the hydrophobic block, and then, from the complete hydrolysis of the polymer obtained;

the blocks water-soluble in nature may come:
  from the polymerization of a mixture of hydrophobic monomers that can be rendered hydrophilic by hydrolysis and of hydrophobic monomers that cannot be rendered hydrophilic by hydrolysis, the hydrophobic monomers that cannot be rendered hydrophilic by hydrolysis being present in an amount of less than 50% by weight, preferably at least 1% by weight, even more preferably between 49 and 10%, with respect to the total weight of the units of the hydrophobic block, and then
  from the complete hydrolysis of the polymer obtained.

If there is partial hydrolysis, the monomer content and the degree of hydrolysis may be varied at the same time.

According to a third method of implementation, the blocks may be obtained by:
  copolymerization of hydrophobic monomers that can be rendered hydrophilic by hydrolysis and of hydrophilic monomers and then
  partial hydrolysis of the polymer obtained to a degree such that what is obtained is:
    either, in the case of the blocks predominantly hydrophobic in nature, an amount of hydrophilic units of less than 33% by weight, preferably at least 1% by weight, even more preferably between 2 and 15%, with respect to the total weight of the units of the hydrophobic block,
    or, in the case of the blocks water-soluble in nature, an amount of hydrophobic units of less than 70% by weight, preferably at least 1% by weight, even more preferably between 50 and 10%, with respect to the total weight of the units of the water-soluble block.

In general, the hydrophobic monomers may be chosen from:
  vinylaromatic monomers, such as styrene,
  dienes, such as butadiene,
  alkyl acrylates and methacrylates the alkyl group of which contains from 1 to 10 carbon atoms, such as methyl, ethyl, n-butyl, 2-ethylhexyl, tert-butyl, isobornyl, phenyl and benzyl acrylates and methacrylates.

Preferably, it is styrene.

The hydrophilic monomers may be chosen from:
  ethylenically unsaturated carboxylic acids such as acrylic and methacrylic acids;
  neutral hydrophilic monomers such as acrylamide and its derivatives (N-methylacrylamide, N-isopropylacrylamide), methacrylamide, polyethylene glycol methacrylate and polyethylene glycol acrylate;
  anionic hydrophilic monomers: sodium 2-acrylamido-2-methylpropanesulphonate (SAMPS), sodium styrenesulphonate and sodium vinylsulphonate.

The monomers that can be rendered hydrophilic by hydrolysis may be chosen from:
  acrylic and methacrylic esters hydrolysable in acid, such as methyl acrylate, ethyl acrylate, hydroxyethyl methacrylate, hydroxyethyl acrylate and tert-butyl acrylate;
  vinyl acetate hydrolysable into vinyl alcohol units;
  quaternized 2-dimethylaminoethyl methacrylate and acrylate (quatdamma and quatdama);
  acrylamide and (meth)acrylamide.

Preferably, the block copolymers according to the invention are diblock copolymers. However, they may also be triblock, or even multiblock copolymers. If the copolymer comprises three blocks, it is preferable to have a block water-soluble in nature flanked by two blocks predominantly hydrophobic in nature.

According to a particular embodiment of the invention, the copolymer is a diblock copolymer comprising a block water-soluble in nature and a block predominantly hydrophobic in nature, in which:
  the block water-soluble in nature contains acrylic acid (AA) units and ethyl acrylate (EtA) units and
  the block predominantly hydrophobic in nature contains styrene (St) units and methacrylic acid (MAA) and/or hydroxyethyl methacrylate (HEMA) units.

Preferably, according to this embodiment, the block water-soluble in nature comes:
  from the polymerization of methacrylic acid (MAA) and of ethyl acrylate (EtA) in an EtA/MAA weight ratio from 90/10 to 99/1, and then
  from the hydrolysis of the polymer obtained to a degree of at least 50 mol % up to 95%.

Preferably, the block predominantly hydrophobic in nature comes from the polymerization of a monomer mixture comprising at least 80% by weight styrene.

Generally, the block copolymers according to the invention have a molecular mass of at most 100,000 g/mol, preferably at least 1000 g/mol.

In general, the above block copolymers can be obtained by any so-called living or controlled polymerization process such as, for example:
  radical polymerization controlled by xanthates according to the teaching of Application WO 98/58974,
  radical polymerization controlled by dithioesters according to the teaching of Application WO 97/01478,
  polymerization using nitroxide precursors according to the teaching of Application WO 99/03894,
  radical polymerization controlled by dithiocarbamates according to the teaching of Application WO 99/31144,
  atom transfer radical polymerization (ATRP) according to the teaching of Application WO 96/30421,
  radical polymerization controlled by iniferters according to the teaching of Otu et al., Makromol. Chem. Rapid. Commun., 3, 127 (1982),
  radical polymerization controlled by degenerative iodine transfer according to the teaching of Tatemoto et al., Jap. 50, 127, 991 (1975), Daikin Kogyo Co Ltd., Japan and Matyjaszewski et al., Macromolecules, 28, 2093 (1995),
  group transfer polymerization according to the teaching of O. W. Webster "Group Transfer Polymerization", pp. 580–588 in "Encyclopedia of Polymer Science and Engineering", vol. 7 and H. F. Mark, N. M. Bikales, C. G. Overberger and G. Menges, Publ., Wiley Interscience, New York, 1987,
  radical polymerization controlled by tetraphenylethane derivatives (D. Braun et al., Macromol.Symp. 111,63 (1996)), and
  radical polymerization controlled by organocobalt complexes (Wayland et al., J.Am.Chem.Soc. 116,7973 (1994)).

The preferred polymerization is living radical polymerization using xanthates.

A possible process for preparing these block copolymers consists in:
  1 the following being brought into contact with one another:
    at least one ethylenically unsaturated monomer, at least one source of free radicals and at least one compound of formula (1):

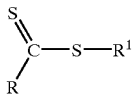

(I)

wherein:
R represents an $R^2O-$, $R^2R^{'2}N-$ or $R^3-$ group, where:
$R^2$ and $R^{'2}$, which are identical or different, represent (i) an alkyl, acyl, aryl, alkene or alkyne group or (ii) a saturated or unsaturated, possibly aromatic, carbocycle or (iii) a saturated or unsaturated heterocycle, these groups and rings (i), (ii) and (iii) possibly being substituted,
$R^3$ represents H, Cl, an alkyl, aryl, alkene or alkyne group, a saturated or unsaturated, optionally substituted (hetero) cycle, an alkylthio, alkoxycarbonyl, aryloxycarbonyl, carboxy, acyloxy, carbamoyl, cyano, dialkylphosphonato, diarylphosphonato, dialkylphosphinato or diarylphosphinato group, or a polymer chain,
$R^1$ represents (i) an optionally substituted alkyl, acyl, aryl, alkene or alkyne group or (ii) an optionally substituted or aromatic, saturated or unsaturated, carbocycle or (iii) an optionally substituted, saturated or unsaturated, heterocycle, or a polymer chain;

2 the above contacting operation being repeated at least once, using:
monomers differing from those in the previous operation, and
instead of the precursor compound of formula (I), the polymer coming from the previous operation; and
3 optionally, the copolymer obtained being hydrolysed.

The $R^1$, $R^2$, $R^{'2}$ and $R^3$ groups may be substituted with alkyl groups, substituted phenyls, substituted aromatic groups or one of the following groups: oxo, alkoxycarbonyl or aryloxycarbonyl (—COOR), carboxy (—COOH), acyloxy (—O$_2$CR), carbamoyl (—CONR$_2$), cyano (—CN), alkylcarbonyl, alkylarylcarbonyl, arylcarbonyl, arylalkylcarbonyl, isocyanate, phthalimido, maleimido, succinimido, amidino, guanidimo, hydroxyl (—OH), amino (—NR$_2$), halogen, allyl, epoxy, alkoxy (—OR), S-alkyl, S-aryl, silyl, groups having a hydrophilic or ionic character, such as alkali metal salts of carboxylic acids, alkali metal salts of sulphonic acid, polyoxy alkylene (POE, POP) chains, and cationic substituents (quaternary ammonium salts), R representing an alkyl or aryl group.

Preferably, the compound of formula (1) is a dithiocarbonate chosen from compounds of the following formulae (IA), (IB) and (IC):

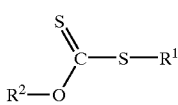

(IA)

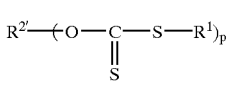

(IB)

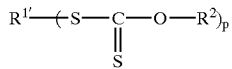

(IC)

wherein:
$R^2$ and $R^{2'}$ represent (i) an alkyl, acyl, aryl, alkene or alkyne group, or (ii) an optionally aromatic, saturated or unsaturated, carbocycle or (iii) a saturated or unsaturated heterocycle, these groups and rings (i), (ii) and (iii) possibly being substituted;
$R^1$ and $R^{1'}$ represent (i) an optionally substituted alkyl, acyl, aryl, alkene or alkyne group or (ii) an optionally substituted or aromatic, saturated or unsaturated, carbocycle or (iii) an optionally substituted, saturated or unsaturated, heterocycle, or a polymer chain;
p is between 2 and 10.

During step 1, a first block of the copolymer is synthesized so as to become water soluble or hydrophobic in nature depending on the nature and the amount of monomers used. During step 2, the other block of the polymer is synthesized.

The ethylenically unsaturated monomers will be chosen from the hydrophilic, hydrophobic and hydrolysable monomers defined above, in proportions suitable for obtaining a block copolymer whose blocks have the characteristics of the invention. According to this process, if all the successive polymerization steps are carried out in the same reactor, it is generally preferable for all the monomers used during one step to have been consumed before the polymerization of the next step starts, therefore before the new monomers have been introduced. However, it may happen that the hydrophobic or hydrophilic monomers of the previous step are still present in the reactor during the polymerization of the next block. In this case, these monomers generally represent no more than 5 mol % of all the monomers and they participate in the following polymerization by contributing to introducing hydrophobic or hydrophilic units into the next block.

For more details with regard to the above polymerization processes, the reader may refer to the contents of Application WO 98/58974.

The hydrolysis may be carried out using a base or an acid. The base may be chosen from alkali or alkaline-earth metal hydroxides, such as sodium hydroxide or potassium hydroxide, alkali metal alcoholates, such as sodium methylate, sodium ethylate, potassium methylate, potassium ethylate and potassium tert-butylate, ammonia and amines such as triethylamines. The acids may be chosen from sulphuric acid, hydrochloric acid and paratoluenesulphonic acid. It is also possible to use an ion-exchange resin or an ion-exchange membrane of the cationic or anionic type. The hydrolysis is generally carried out a temperature of between 5 and 100° C., preferably between 15 and 90° C.

After hydrolysis, the block copolymer can be washed, for example by dialysis against water, or using a solvent such as alcohol. It may also be precipitated by lowering the pH below 4.5.

The hydrolysis may be carried out on a monoblock polymer, which will then be linked to other blocks, or on the final block copolymer.

The block copolymer is present in the aqueous liquid of said fracturing fluid at a concentration by weight of between 0.1 and 10%, more preferably between 0.5 and 5%, and even more preferably between 1 and 3% vis-à-vis the total weight of said aqueous liquid. The aqueous liquid of said fracturing fluid comprises water and all other liquid components if any.

The essential component of the fracturing fluid is water which may be deionized or contain ions. Good results have surprisingly occurred when using so-called "hard" water, which may contain magnesium ions, calcium ions, or sodium ions among other metallic ions. The respective amounts of ions in the water typically range from about 10 to about 50 ppm, about 100 to about 300 ppm sodium ions and about 50 to 150 ppm calcium ions.

Still other additives include proppants which may be provided with the fracturing fluid to maintain the fissures caused by pumping and thickening the fracturing fluid into the well bore. Proppant particles include for example, gravel, quartz sand grains, sintered bauxite, glass and ceramic beads, walnut shell fragments, aluminum pellets and the like. The propping agents are typically included in an amount of 0.2 to 3 kg per liter of fluid and the particle size is about 2 U.S. mesh.

The fracturing fluid may comprise one or more thermal stabilizing agents known in the art for use in connection with fracturing fluids such as sodium thiosulfate, methanol, ethylenglycol, isopropanol, thiourea, and sodium thiosulfite.

The fracturing fluid may further include clay stabilizers, for example KCl, whose concentration by weight in said fluid is typically between 1.0 and 4.0%.

Preparing the fracturing fluid comprises mixing the various components together in the amounts above indicated.

The process of using the fracturing fluid comprising the step of injecting into a well bore at a feed rate, pressure and shear rate necessary to create fissures into the subterranean formation at high temperatures. The fracturing fluid of the present invention typically presents a minimum viscosity of 50 cp, at a shear rate of 40 $s^{-1}$ up to about 210° C. during 3 h and outmatches guars and viscoelastic polymers known in the art of fracturing.

The following examples illustrate the invention without however limiting its scope.

EXAMPLES

In the examples which follow:

$M_n$ represents the number-average molecular mass of the polymers, $M_n$ being expressed in polystyrene equivalents (g/mol), $M_w$ represents the weight-average molecular mass, $M_w/M_n$ represents the polydispersity index, the polymers, before hydrolysis, are analysed in GPC with THF as the elution solvent.

A—Synthesis of the Block Copolymers (Examples 1 to 7)

For all the following examples, the polymerizations are carried out to a degree of conversion of the monomers of greater than 95%.

Example 1

Synthesis and Hydrolysis of a Poly(styrene/methacrylic acid/2-hydroxyethyl methacrylate)-b-poly(ethylacrylate/methacrylic acid) Diblock Copolymer 1.1. Synthesis of a Random Styrene/methacrylic acid/2-hydroxyethyl Methacrylate Copolymer. Mass ratios: St/MA/HEMA=90/5/5.

The polymerization was carried out in emulsion, in a jacketed reactor fitted with a stainless steel three-bladed stirrer. Introduced as a stock into the reactor, at room temperature, were 1178 g of water and 25.36 g of dodecyl sulphate (Texapon K12/96). The mixture obtained was stirred for 30 minutes (at 175 rpm) under nitrogen. The temperature was then raised to 85° C. and then 1.55 g of ammonium persulphate $(NH_4)_2S_2O_8$ in 2.48 g of water were incorporated.

At the same time, a mixture comprising:

248 g of styrene (St), 13.95 g of methacrylic acid (MAA), 13.95 g of 2-hydroxyethyl methacrylate (HEMA), and 7.44 g of methyl α-(O-ethylxanthyl)-propionate $(CH_3CHCO_2Me)SCSOEt$ (composed of formula IA) started to be added.

The addition lasted 55 minutes. 15 minutes after starting to add the mixture comprising the monomers and the methyl α-(O-ethylxanthyl)propionate, 0.56 g of sodium carbonate $Na_2CO_3$ dissolved in 100 g of water started to be added. The latter addition took place over 45 minutes.

After the various ingredients had been completely added, an emulsion polymer (latex) was obtained which was maintained at 85° C. for one hour. After cooling to room temperature, 91 g of the polymer emulsion were removed for analysis.

The analysis results were as follows:

$M_n$=5900 g/mol $M_w/M_n$=2.2

1.2. Synthesis of the diblock copolymer

The synthesis started with the emulsion copolymer obtained above (section 1.1.). To this were added at 85° C., over one hour:

308 g of ethyl acrylate (EtA);

16 g of methacrylic acid (MAA); and 0.94 g of $Na_2CO_3$ diluted in 100 g of water.

The system was maintained at this temperature for a further two hours. Next, 1.46 g of t-butyl perbenzoate were added. Then the following were introduced over one hour (until the end of the reaction): 0.59 g of erythorbic acid diluted in 47 g of water.

After cooling to room temperature, the polymer obtained was analysed. The results of the analysis were as follows:

pH=4.6

$M_n$=13,300 g/mol $M_w/M_n$=1.75

1.3. Hydrolysis of the diblock copolymer

The hydrolysis was carried out in the reactor for synthesizing the block copolymer emulsion. Introduced into the reactor were:

200 g of the above copolymer (section 1.2.), expressed as dry matter (650 g of a 30.8% solution);

1900 g of water (in order to adjust the solids content to 10% by weight at the end of hydrolysis).

Next, the pH was adjusted to a value of 8 using 1N sodium hydroxide. The temperature was raised to 90° C. and the reaction carried out under nitrogen.

With vigorous stirring (160 rpm), 528 g of 2N sodium hydroxide (corresponding to one molar equivalent of sodium hydroxide with respect to ethyl acrylate) were added over 1 hour. After all the sodium hydroxide had been added, the reaction was maintained under these conditions for 11 hours.

The degree of hydrolysis of the acrylate units was measured by proton NMR to be 88 mol %.

The product recovered at the end of the reaction was a translucent gel.

Example 2

Synthesis and Hydrolysis of a Poly(styrene/methacrylic acid)-b-poly(ethyl acrylate/methacrylic acid) Diblock Copolymer 2.1. Synthesis of a Styrene/methacrylic Acid Random Copolymer: St/MAA Mass Ratio =95/5

Introduced into the reactor as a stock, at room temperature, were 1112 g of water and 25.36 g of dodecyl sulphate (Texapon K12/96). The mixture obtained was stirred for 30 minutes (175 rpm) under nitrogen. The temperature was then raised to 85° C. and 1.55 g of ammonium persulphate $(NH_4)_2S_2O_8$ diluted in 2.48 g of water were then added.

At the same time, a mixture comprising:

248.04 g of styrene (St), 13.99 g of methacrylic acid (MAA), and 7.44 g of methyl α-(O-ethylxanthyl)propionate $(CH_3CHCO_2Me)SCSOEt$ started to be added.

The addition was continued for 55 minutes. Fifteen minutes after the start of adding the mixture comprising the comonomers and the methyl α-(O-ethylxanthyl)propionate, the addition over 45 minutes of 0.56 g of sodium carbonate $Na_2CO_3$ dissolved in 100 g of water was started. After the various ingredients had been completely added, the copolymer emulsion obtained was maintained at 85° C. for one hour.

After cooling to room temperature, 89 g of the polymer emulsion obtained were removed for analysis.

The results were as follows:

$M_n$=6500 g/mol $M_w/M_n$=2.3

2.2. Synthesis of the diblock copolymer

The synthesis started with the emulsion copolymer obtained above (section 2.1.). To this were added at 85° C., over one hour:

308 g of ethyl acrylate (EtA);

16 g of methacrylic acid (MAA); and 0.94 g of $Na_2CO_3$ diluted in 100 g of water.

The system was maintained at this temperature for a further two hours. Next, 1.46 g of t-butyl perbenzoate were added. Then the following were introduced over one hour (until the end of the reaction): 0.59 g of erythorbic acid diluted in 47 g of water.

After cooling to room temperature, the diblock copolymer emulsion obtained was analysed. The results were as follows:

pH=5.6

$M_n$=13,900 g/mol $M_w/M_n$=1.7

2.3. Hydrolysis of the Diblock Copolymer

The above diblock copolymer (section 2.2.) was hydrolysed.

The operating method was the same as that in Example 1 (section 1.3.) (one molar equivalent of NaOH with respect to the ethyl acrylate units).

The degree of hydrolysis obtained was 84 mol %.

The product recovered at the end of the reaction was a translucent gel.

Example 3

Synthesis and Hydrolysis of a Poly(styrene/2-hydroxyethyl methacrylate)-b-poly(ethyl acrylate/methacrylic acid) Diblock Copolymer 3.1. Synthesis of a Styrene/2-hydroxyethyl Methacrylate Random Copolymer: St/HEMA Mass Ratio=95/5

The experimental protocol was the same as that described in Example 2 (section 2.1.) except that the methacrylic acid was replaced with an equal amount by weight of 2-hydroxyethyl methacrylate (HEMA). At the end of polymerization, an emulsion copolymer was obtained, 89 g of which were removed for analysis.

The analysis was as follows:

$M_n$=6400 g/mol $M_w/M_n$=2.2

3.2. Synthesis of the Diblock Copolymer

The synthesis started with the emulsion copolymer obtained above (section 3. 1.). To this were added at 85° C., over one hour:

308 g of ethyl acrylate (EtA);

16 g of methacrylic acid (MAA); and 0.94 g of $Na_2CO_3$ diluted in 100 g of water.

The system was maintained at this temperature for a further two hours. Next, 1.46 g of t-butyl perbenzoate were added. Then the following were introduced over one hour (until the end of the reaction): 0.59 g of erythorbic acid diluted in 47 g of water.

After cooling to room temperature, the polymer obtained was analysed. The results were as follows:

pH=5.1

$M_n$=13,000 g/mol $M_w/M_n$=1.8

3.3.Hydrolysis of the Diblock Copolymer

The above diblock copolymer (section 3.2.) was hydrolysed.

The operating method was the same as that in Example 1 (section 1.3.) (one molar equivalent of NaOH with respect to the EtA units).

The degree of hydrolysis obtained was 90 mol %.

Example 4

Synthesis and Hydrolysis of a Poly(styrene/methacrylic acid)-b-poly(ethyl acrylate/methacrylic acid) Diblock Copolymer 4.1 Synthesis of a Styrene/methacrylic Acid Random Copolymer:St/MAA Mass Ratio=90/10.

Introduced into the reactor as a stock, at room temperature, were 1178 g of water and 25.36 g of dodecyl sulphate (Texapon K12/96). The mixture obtained was stirred for 30 minutes (175 rpm) under nitrogen. Next, the temperature was raised to 83° C. and a mixture 1 was added, this comprising:

24.8 g of styrene (St);

2.72 g of methacrylic acid (MAA); and 7.42 g of xanthate $(CH_3CHCO_2Me)SCSOEt$.

The mixture was heated to 85° C. and then 1.55 g of ammonium persulphate $(NH_4)_2S_2O_8$ diluted in 2.48 g of water were introduced.

At the same time, the addition of a mixture 2 comprising:

223.24 g of styrene (St) and 24.88 g of methacrylic acid (MAA) was started.

The addition was continued for 55 minutes. Fifteen minutes after the comonomer mixture 2 had been added, the addition over 45 minutes of 0.56 g of sodium carbonate $Na_2CO_3$ dissolved in 100 g of water was started. After the various ingredients had been completely added, the copolymer emulsion obtained was maintained at 85° C. for one hour.

After cooling to room temperature, 91 g of the emulsion was removed for analysis.

The results of the analysis were as follows:

$M_n$=6300 g/mol $M_w/M_n$=2.1

4.2. Synthesis of the Diblock Copolymer

The synthesis started with the emulsion copolymer obtained above (section 4.1.). To this were added at 85° C., over one hour:

308 g of ethyl acrylate (EtA);

16 g of methacrylic acid (MAA); and 0.94 g of $Na_2CO_3$ diluted in 100 g of water.

The system was maintained at this temperature for a further two hours. Next, 1.46 g of t-butyl perbenzoate were added. Then the following were introduced over one hour (until the end of the reaction): 0.59 g of erythorbic acid diluted in 47 g of water.

After cooling to room temperature, the polymer obtained was analysed. The results were as follows:

$M_n$=13,700 g/mol $M_w/M_n$=1.8

4.3. Hydrolysis of the Diblock Copolymer

The operating method was the same as that in Example 1 (section 4.3.) (one molar equivalent of NaOH with respect to the EtA units).

The degree of hydrolysis obtained was 90 mol %.

The product recovered at the end of the reaction was a translucent gel.

Example 5

Synthesis and Hydrolysis of a Poly(styrene/methacrylic acid/2-hydroxyethyl methacrylate)-b-poly(ethyl acrylate/methacrylic acid) Diblock Copolymer This diblock copolymer was synthesized in the same manner as in Example 4.

The styrenelmethacrylic acid/2-hydroxyethyl methacrylate random copolymer obtained had the following characteristics:

mass ratios: St/MAA/HEMA=80/10/10;

$M_n$=6900 g/mol;

$M_w/M_n$=2.3.

Starting from this copolymer, a diblock copolymer was synthesized by polymerizing an ethyl acrylatelmethacrylic acid mixture having an EtA/MAA mass ratio of 95/5.

The diblock copolymer had the following characteristics:

pH=5.1;

$M_n$=13,800 g/mol;

$M_w/M_n$=1.7.

The diblock copolymer was partially hydrolysed to a degree corresponding to 83 mol %.

Example 6

Synthesis and Hydrolysis of a Poly(styrene/ethyl acrylate)-b-poly(ethyl acrylate/methacrylic acid) Diblock Copolymer This diblock copolymer was synthesized in the same way as in Example 4.

The styrenelethyl acrylate random copolymer obtained had the following characteristics:

St/EtA mass ratio=80/20;

$M_n$=7400 g/mol;

$M_w/M_n$=2.2.

Starting from this copolymer, a diblock copolymer was synthesized by polymerizing an ethyl acrylate/methacrylic acid mixture having an EtA/MAA mass ratio of 95/5.

The diblock copolymer had the following characteristics:

pH=5.1;

$M_n$=14,200 g/mol;

$M_w/M_n$=1,9.

The diblock copolymer was partially hydrolysed to a degree corresponding to 90 mol %.

Example 7

Synthesis and Hydrolysis of a Styrene-b-poly(ethyl acrylate/methacrylic Acid) Diblock Copolymer This diblock copolymer was synthesized in the same manner as in Example 4.

The styrene polymer obtained had the following characteristics:

$M_n$=2600 g/mol;

$M_w/M_n$=2.4.

Starting from this polymer, a diblock copolymer was synthesized by polymerizing an ethyl acrylate/methacrylic acid mixture having an EtA/MAA mass ratio of 95/15.

The diblock copolymer had the following characteristics:

pH=5.1;

$M_n$=17,700 g/mol;

$M_w/M_n$=2.7.

The diblock copolymer was partially hydrolysed to a degree corresponding to 87 mol %.

B—PROPERTIES OF THE BLOCK COPOLYMERS of examples 1 to 7

Example 8

Diblock Copolymers Comprising a Predominantly Hydrophobic Block and a Water-soluble Block The hydrolysed block copolymers of Examples 1 to 6 had:

a water-soluble block and a predominantly hydrophobic block.

After hydrolysis, these polymers were washed by dialysis against water. Depending on the analytical test to which they were subjected, they were then:

either concentrated by freeze drying and then redispersed;

or diluted in millipore water so as to bring them to the desired concentration.

The pH was adjusted to 9.

Test for the Presence of a Viscoelastic Gel

All these block copolymers form a translucent gel at low concentration in water. The critical weight concentration at which they form a gel in solution, called the "critical gelling concentration" is given in Table 1. This concentration is that for which the elastic modulus G' becomes greater than the viscous modulus (G"). The measurements are given in Table 1.

TABLE 1

| Example | Critical gelling concentration |
|---|---|
| 1 | 4% by weight |
| 2 | 4% by weight |
| 3 | 5% by weight |
| 4 | 2% by weight |
| 5 | 3% by weight |
| 6 | 4% by weight |

In the case of Examples 2, 4 and 5, the values of the elastic modulus (G') and the viscous modulus (G") were measured using a Rheometrixe ARES rheometer under the following conditions:
frequencies between $10^{-2}$ and $10^2$ rad/s;
20% deformation,
5% concentration by weight (solid content) of polymer.
The measurements are given in Table 2.

TABLE 2

| Example | G' (Pa) | G" (Pa) |
|---|---|---|
| 2 | 60 | 10 |
| 4 | 400 | 20 |
| 5 | 100 | 10 |

It may be seen that the elastic modulus is always greater than the viscous modulus. The strongest gel is that of Example 4 (highest elastic modulus) which also has the lowest critical gelling concentration.

Example 9
Diblock Polymers Comprising a Completely Hydrophobic Block Block

Copolymer According to Example 7

This block copolymer dissolved in water formed a translucent gel at low concentration: the value of the critical gelling concentration was 3% by weight.
This copolymer was analysed using the following:
by neutron scattering, it was found that the spherical hydrophobic polystyrene core had a "Guinier" radius of 8.6 nm,
the shape and the size were confirmed by an electron cryo-micrograph,
the size of the object determined by quasielastic light scattering was 337 nm and its fractal dimension determined by static light scattering was 1.

We therefore obtained in the case of a very asymmetric diblock (17/83) with a completely hydrophobic block and a partially hydrophilic block the same type of property as with a partially hydrophilic/partially hydrophobic symmetric block (50/50) (Examples 1 to 6).

With a completely hydrophobic block, it is necessary to have a very asymmetric diblock (small hydrophobic block) in order to maintain the solubility and the gelling.

C. Block Copolymer Synthesis (Examples 10, 11, 12 and 13)

Example 10

Synthesis and Hydrolysis of a Poly(styrene/methacrylic acid)-b-poly(ethyl acrylate/methacrylic Acid) Diblock Copolymer 10.1. Synthesis of a Styrene/methacrylic Acid Random Copolymer. St/MAA Mass Ratio: 98/2; Theoretical Mass: $M_n$=2000 g/mol.

Introduced into a reactor as a stock, at room temperature, were 682.5 g of water, 8.54 g of sodium dodecyl sulphate and 0.189 g of sodium carbonate $Na_2CO_3$. The mixture obtained was stirred for 30 minutes (190 rpm) under nitrogen. Next, the temperature was raised to 75° C. before adding a mixture 1 comprising:
5.19 g of styrene (St);
0.105 g of methacrylic acid (MAA); and
5.51 g of xanthate $(CH_3CHCO_2Me)SCSOEt$.
The mixture was heated to 85° C. and then 1.21 g of ammonium persulphate $(NH_4)_2S_2O_8$ were introduced.
At the same time, the addition of a mixture 2 comprising:
46.78 g of styrene (St) and
0.945 g of methacrylic acid (MAA) was started.
The addition was continued for 60 minutes. After complete addition of the various ingredients, the copolymer emulsion obtained was maintained at 85° C. for one hour.

10.2. Synthesis of the Diblock Copolymer. EtA/MAA Mass Ratio: 98/2; theoretical mass $M_n$=21,468 g/mol.

The synthesis started with the emulsion copolymer obtained above (section 10.1.), into which were introduced 0.576 g of ammonium persulphate $(NH_4)_2S_2O_8$ diluted in 10 g of water.
To this were added at 85° C., over one hour:
481.9 g of ethyl acrylate (EtA);
9.8 g of methacrylic acid (MAA); and
0.545 g of $Na_2CO_3$ diluted in 150 g of water.
The system was maintained at this temperature for a further three hours.

10.3. Hydrolysis of the diblock copolymer

Specimen 10.3.a : The above copolymer was hydrolysed. Introduced into the reactor were:
30 g of the above copolymer (section 10.2.) expressed as dry matter (40.2% of 74.6 g);
157.4 g of water (in order to adjust the solids content to 10% by weight at the end of hydrolysis).

The temperature was raised to 90° C. While stirring vigorously, 67.9 ml of 2N sodium hydroxide (corresponding to 0.51 molar equivalent of sodium hydroxide with respect to ethyl acrylate) were added over 1 hour. After the sodium hydroxide had been completely added, the reaction was maintained under these conditions for 24 hours. The product recovered at the end of the reaction was a translucent gel. The hydrolysis rate determined by NMR is about 44%, Specimen 10.3.b : The operating method was the same as that for Specimen 10.2. The amount of sodium hydroxide added corresponded to 0.66 molar equivalent of sodium hydroxide with respect to ethyl acrylate. The product recovered at the end of the reaction was a translucent gel. The hydrolysis rate, determined by NMR is about 61%.

Specimen 10.3.c: The operating method was the same as that for Specimen 10.2. The amount of sodium hydroxide added corresponded to 0.76 molar equivalent of sodium hydroxide with respect to ethyl acrylate. The product recovered at the end of the reaction was a translucent gel. The hydrolysis rate, determined by NMR is about 72%.

Specimen 10.3.d The operating method was the same as that for Specimen 10.2. The amount of sodium hydroxide added corresponded to 0.9 molar equivalent of sodium hydroxide with respect to ethyl acrylate. The product recovered at the end of the reaction was a translucent gel. The hydrolysis rate, determined by NMR is about 79%.

Specimen 10.3.e: The operating method was the same as that for Specimen 10.2. The amount of sodium hydroxide added corresponded to 2 molar equivalents of sodium hydroxide with respect to ethyl acrylate. The product recovered at the end of the reaction was a translucent gel. The hydrolysis rate, determined by NMR is higher than 95% and lesser than 98%.

Example 11

Synthesis and Hydrolysis of a Poly(styrene/methacrylic acid)-b-poly(ethyl acrylate/methacrylic Acid) Diblock Copolymer In this example, the experimental protocol of previous example 10 is carried out again except that the St/MAA random copolymer of the first block has a theoretical mass of 3000 g/mol and the amount of sodium hydroxide corresponds to 0.76 molar equivalent of sodium hydroxide with respect to ethylacrylate.

Example 12

Synthesis and Hydrolysis of a Poly(styrene/methacrylic acid)-b-poly(ethyl acrylate/methacrylic Acid)-b-poly(styrene/methacrylic Acid) Triblock Copolymer of 2000-19468-500 Theoretical Mass 12.1. Synthesis of a Styrene/methacrylic Acid Random Copolymer. St/MAA mass ratio: 98/2

The experimental protocol was identical to that described in Example 10, section
12.2. Synthesis of the Diblock Copolymer. EtA/MAA Mass Ratio: 98/2; theoretical mass $M_n$: 21,468 g/mol The experimental protocol was identical to that described in Example 10, section 10.2.
12.3. Synthesis of the Triblock Copolymer. PS/MAA Mass Ratio in the 3rd block: 98/2; theoretical mass $M_n$: 21,968 g/mol.

Starting with 968 g of the diblock copolymer obtained above (section 11.2), 0.032 g of sodium carbonate $Na_2CO_3$ diluted in 5 g of water and 0.2878 g of ammonium persulphate $(NH_4)_2S_2O_8$ diluted in 10 g of water were introduced.

Over one hour, the following were added at 85° C.:

9 g of styrene (St);

0.173 g of methacrylic acid (MAA).

The system was maintained at this temperature for a further one hour.
12.4. Hydrolysis of the Triblock Copolymer 12.4.a: the above copolymer was hydrolysed according to the protocol described for Specimen 10.3.a. The amount of sodium hydroxide added corresponded to 0.76 molar equivalents of sodium hydroxide with respect to ethyl acrylate. The product recovered at the end of the reaction was a translucent gel. The hydrolysis rate is higher than 95% and lesser than 98%.

12.4.b: the process of above example 12.4.a is carried out again except that 2 molar equivalents of sodium hydroxide with respect to ethyl acrylate is used.

Example 13

Synthesis and Hydrolysis of a Poly(styrene/methacrylic Acid)-b-poly(ethyl acrylate/methacrylic Acid) Diblock Copolymer In this example, the experimental protocol of previous example 10-1, 10-2 is carried out again, except that the hydrolysis step 10-3-c is carried out in a mixture isopropanol/water (13/87) by volume instead of water.

D—PROPERTIES OF THE BLOCK COPOLYMERS (of examples 10 and 11)

Example 14

Diblock Copolymers Comprising a Predominantly Hydrophobic Block and a Water-soluble Block. Variation in the Number of Hydrophobic Units in the Water-soluble Block.

After hydrolysis, the copolymers 10.3.a, 10.3.b, 10.3.c and 10.3.d were diluted in millipore water in order to bring them to the desired concentration. The copolymer 10.3.e was washed by dialysis against water and then diluted in millipore water in order to bring it to the desired concentration.

In the case of the copolymers 10.3.a, 10.3.b, 10.3.c, 10.3.d and 10.3.e, the values of the elastic modulus (G') and the viscous modulus (G") were measured using a Rheometrix SR200 rheometer under the following conditions:

frequencies between $10^{-2}$ and $10^2$ rad/s, 5 or 10% deformation,

2% concentration by weight (solid content) of polymer.

The values obtained at a frequency of 1 rad/s are given in Table 3.

TABLE 3

| Example | G' (Pa) | G" (Pa) |
|---------|---------|---------|
| 10.3.a | 11.9 | 4.4 |
| 10.3.b | 16.8 | 5.0 |
| 10.3.c | 9.1 | 4.1 |
| 10.3.d | 1.8 | 1.2 |
| 10.3.e | 0.65 | 0.40 |

From Table 3, it appears that the elastic modulus exhibits a maxima for a hydrolysis rate of about 60%.

Example 15

Triblock Copolymer Comprising a Predominantly Hydrophobic Block, a Water-soluble Block and a Predominantly Hydrophobic Block.

After hydrolysis, the copolymer of Example 12.4.b was washed by dialysis against water and then diluted in water in order to bring it to the desired concentration. The values of the elastic modulus and the viscous modulus were determined using the same operating method as in Example 14.

The values obtained at a frequency of 1 rad/s are given in Table 4.

TABLE 4

| Example | G' (Pa) | G" (Pa) |
|---------|---------|---------|
| 12.4.b | 30.2 | 3.6 |
| 10.3.e | 0.65 | 0.40 |

From table 4, it appears that using a triblock provides a substantial increase of the elastic modulus.

E-: Oilfield Applicability Tests

Example 16

Illustration of the High Temperature Viscosity Capabilities of the Copolymers.

The viscometer measurements are taken on a Fann 50C Rheometer. This is a rotating cup and bob viscometer with sample heating and pressurization capacities. All measurements are made under nitrogen pressure at 450 psi, with shear rates and temperature profiles as indicated. The viscometer geometries used are standards for the oilfield industry and documented as either R1B1 or R1B5 types. This viscometer is the standard for the oilfield industry because of it's high temperature/pressure capabilities and geometry choices.

All tested gels are run with 100 ppm of $Ca^{++}$ by weight in order to simulate field water hardness conditions.

Results are gathered in table 5 herein below wherein the maximum usable temperature limits are indicated for the copolymers, as tested at different % actives (weight % of copolymer in tested gels samples). All samples are run in hard water (100 ppm Ca++) to simulate field water conditions. The criteria used to judge usable temperature is a 50 cp minimum viscosity at 100 s-1. Also included in table 5 is initial gel viscosity V1 at room temperature (20° C.) and temperature performance T1 for a minimum viscosity of 50 cp at 100 s-1. Also included in table 5 is initial gel viscosity V2 at room temperature (20° C.) and temperature performance T2 for a minimum viscosity of 50 cp at 100 s-1, with 2% KCl by weight added to the gel.

The methodology to determine maximum usable temperature is to run the Fann 50C viscometer at a constant shear rate of 100 s-1 with an R1B1 geometry which called for a rotational speed of 58.7 RPM. The temperature was ramped from ambient temperature to 218° C. at a linear rate with a total run time of about 2 hours. Viscosity measurements were calculated every 5° C. (from an average of several data points) and the temperature point or range T1 and T2 closest to crossing the 50 cp minimum, without falling below, is recorded in table 5. The initial viscosity measurement is an average several data points taken at ambient room temperature, before the heating ramp initiated.

TABLE 5

| Copolymer of example | W % of copo in gel | V1 | T1 (° C.) | V2 | T2 (° C.) |
|---|---|---|---|---|---|
| 4 | 1.5 | 550 | 160 | N/A | N/A |
| 4 | 2.0 | 1116 | 182–188 | gel/water phase | N/A |
| 4 | 3.0 | 2577 | 199 | gel/water phase | N/A |
| 10-3-c | 2.0 | 445 | 132 | | |
| 10-3-c | 3.0 | 947 | 165–171 | 850 | 154–160 |
| 12.4.a | 2.0 | 688 | 160 | | |
| 12.4.a | 3.0 | 1325 | 188–193 | 1190 | 154–160 |
| 11 | 3.0 | 1050 | 199–204 | 880 | 165–171 |
| 13 | 3.0 | 2000 | 193–199 | 1860 | 182–188 |

Table 5 shows that several gels tested had a usable temperature range above 177° C.

Example—17

Extended Time at Temperature Performance:

This example illustrates the extended time at temperature performance of the copolymers gels at 2 different percentage actives levels with 100 ppm $Ca^{++}$ and without KCl. A 2 to 3 hour Fann 50 cp viscosity run at temperature is routinely used to determine if the gel properties will hold up under down hole conditions for the time required to complete the fracturing operation. The percentage actives level is 2% for copolymer of example 4 and 3% for all the other copolymers. The methodology used in this example is as follows: The Fann 50C viscometer is preheated to the desired temperature. The samples are run with a program that holds the temperature constant and varies the shear rates at 40 s-1, 100 s-1 and 170 s-1 at predetermined ramps, which occur at 30 minute intervals for 3 hours. An initial shear rate ramp is also run at room temperature, before the sample is immersed in the heated bath. These shear rate ramps are run to determine the shear thinning characteristics of the sample. Table 6 herein below reports the initial viscosities of each sample under the 3 following shear rate conditions: 40 $s^{-1}$, 100 $s^{-1}$ and 170 $s^{-1}$. Three temperature ranges 163° C., 177° C. and 188° C. were chosen. It can be seen from Table 6 that, using the 100s-1 shear rate after 3 hours at 188° C. as a standard, the 3% gel of the triblock copolymer of example 13 shows the best properties on average.

One sample, the 3% copolymer of example 13, was run in 2% KCl to determine if the salt would have any effect on long term stability at temperature. The KCl sample remained stable, but at a reduced performance level, as previously seen in table 5.

Furthermore, table 6 shows that, once the material comes to temperature, the viscosity remains relatively unchanged throughout the 3 hour test, showing excellent temperature stability.

TABLE 6

| Copo | Room Temp. Viscosity, cp | | | 3 h at 163° C. | | | 3 h at 177° C. | | | 3 h at 188° C. | | |
|---|---|---|---|---|---|---|---|---|---|---|---|---|
| Exam Shear | 40 s-1 | 100 s-1 | 170 s-1 | 40 s-1 | 100 s-1 | 170 s-1 | 40 s-1 | 100 s-1 | 170 s-1 | 40 s-1 | 100 s-1 | 170 s-1 |
| 4 | 2156 | 1207 | 862 | 221 | 108 | 72 | | | | | | |
| 4 | 5523 | 2762 | 1849 | 606 | 276 | 175 | | | | 244 | 119 | 78 |
| 10-3-c | 2192 | 1010 | 645 | 235 | 126 | 82 | | | | 86 | 51 | 38 |
| 12.4.a | 3307 | 1446 | 895 | 540 | 263 | 173 | 264 | 131 | 87 | 119 | 61 | 41 |
| 13 | 4198 | 2127 | 1435 | | | | 142 | 69 | 45 | | | |
| 13 | 3169 | 1932 | 1450 | | | | | | | 334 | 163 | 108 |
| 11 | 3196 | 1506 | 974 | | | | | | | | | |

What is claimed is:

1. A hydraulic fracturing fluid composition comprising:
   a) an aqueous liquid, and
   b) at least one block water-soluble in nature and containing hydrophobic units and at least one block predominantly hydrophobic in nature forming a viscoelastic gel in said aqueous liquid, and, wherein, said predominantly hydrophobic block has hydrophilic units in an amount equal to between 0 and less than 33% by weight, with respect to the total weight of the units of the hydrophobic block.

2. A fracturing composition according to claim 1, wherein the predominantly hydrophobic block has hydrophilic units in an amount of between 1% and 33% by weight with respect to the total weight of the units of the hydrophobic block.

3. A fracturing composition according to claim 2, wherein the predominantly hydrophobic block has hydrophilic units in an amount of between 2 and 15%, with respect to the hydrophobic units.

4. A fracturing composition according to claim 1, wherein the block water-soluble in nature has hydrophobic units in an amount of less than 70% by weight with respect to the total weight of the units of the block water-soluble in nature.

5. A fracturing composition according to claim 4, wherein the block water-soluble in nature has hydrophobic units in an amount of between 1% and 50% by weight, with respect to the total weight of the units of the block water-soluble in nature.

6. A fracturing composition according to claim 1, wherein the block predominantly hydrophobic in nature is a completely hydrophobic block.

7. A fracturing composition according to claim 1, wherein the mass ratio of the blocks predominantly hydrophilic in nature to the blocks predominantly hydrophobic in nature is between 95/5 and 20/80.

8. A fracturing composition according to claim 1, wherein the copolymer is at a concentration of between 0.1% and 10% by weight.

9. A fracturing composition according to claim 8, wherein the copolymer is at a concentration of between 0.5% and 5% by weight.

10. A fracturing composition according to claim 1, comprising at least one block water-soluble in nature and at least one block predominantly hydrophobic in nature, wherein at least one of said blocks is a copolymer coming from the copolymerization of hydrophilic and hydrophobic monomers.

11. A fracturing composition according to claim 10, wherein the amounts of hydrophilic and hydrophobic units in each of said blocks are controlled by the respective contents of hydrophilic monomers and of hydrophobic monomers during the polymerization of the blocks.

12. A fracturing composition according to claim 1, comprising at least one block water-soluble in nature or at least one block predominantly hydrophobic in nature, wherein at least one of said blocks is a copolymer coming:
   from the polymerization of monomers that may be rendered hydrophilic by hydrolysis, and optionally of non-hydrolysable hydrophobic monomers and of hydrophilic monomers, and then,
   from the hydrolysis of the polymer obtained.

13. A fracturing composition according to claim 12, wherein the amounts of hydrophilic and hydrophobic units in each of said blocks are controlled by the amount of monomers that can be rendered hydrophilic by hydrolysis and by the degree of hydrolysis.

14. A fracturing composition according to claim 10, wherein the hydrophobic monomers are:
   vinylaromatic monomers;
   diolefins; or
   alkyl acrylates and methacrylates, whose alkyl group contains from 1 to 10 carbon atoms.

15. A fracturing composition according to claim 10, wherein the hydrophilic monomers are:
   ethylenically unsaturated carboxylic acids;
   acrylamide, (N-methylacrylamide, N-isopropylacrylamide), methacrylamide, polyethylene glycol methacrylate, polyethylene glycol acrylate;
   sodium 2-acrylamido-2-methylpropanesulphonate (SAMPS), sodium styrenesulphonate or sodium vinylsulphonate.

16. A fracturing composition according to claim to 15, wherein the monomers that can be rendered hydrophilic by hydrolysis are:
   methyl acrylate, ethyl acrylate, hydroxyethyl acrylate, hydroxyethyl methacrylate, tert-butyl acrylate;
   vinyl acetate;
   quaternized 2-dimethylaminoethyl methacrylate, quaternized 2-dimethylaminoethyl acrylate;
   acrylamide or (meth)acrylamide.

17. A fracturing composition according to claim 1, wherein said copolymer is a diblock copolymer, a triblock copolymer having a block water-soluble in nature flanked by two blocks predominantly hydrophobic in nature, or a triblock copolymer having a block predominantly hydrophobic in nature flanked by two blocks water-soluble in nature.

18. A fracturing composition according to claim 1, wherein said copolymer is a diblock copolymer comprising a block water-soluble in nature and a block predominantly hydrophobic in nature,
   the block water-soluble in nature containing acrylic acid (AA) units and ethyl acrylate (EtA) units and
   the block predominantly hydrophobic in nature containing styrene (St) units and methacrylic acid (MAA) or hydroxyethyl methacrylate (HEMA) units.

19. A fracturing composition according to claim 14, wherein the block water-soluble in nature comes:
   from the polymerization of methacrylic acid (MAA) and of ethyl acrylate (EtA) in an EtA/MAA weight ratio from 90/10 to 99/1, and then
   from the hydrolysis of the polymer obtained to a degree of at least 50 mol % up to 95% (mol).

20. A fracturing composition according to claim 19, wherein the block predominantly hydrophobic in nature comes from the polymerization of a monomer mixture containing at least 80% by weight styrene.

21. A fracturing composition according to claim 1, wherein said copolymer has a molecular mass of at most 100,000 g/mol.

22. A fracturing composition according to claim 1, wherein said copolymer is made by so-called living or controlled polymerization process.

23. A fracturing fluid according to claim 1, further comprising a proppant.

24. A fracturing fluid according to claim 23, wherein said proppant is gravel, quartz sand grains, sintered bauxite, glass and ceramic beads, walnut shell fragments, or aluminum pellets.

25. A fracturing fluid according to claim 1, further comprising a thermal stabilizer.

26. A fracturing fluid according to claim 25, wherein the thermal stabilizer is sodium thiosulfate, methanol, ethylenglycol, isopropanol, thiourea, and sodium thiosulfite.

27. A fracturing fluid according to claim 1, further comprising KCl as a clay stabilizer.

28. A process to create fissures into a subterranean formation which surrounds a well bore, comprising the step of injecting into said bore a fracturing fluid as defined in claim 1.

* * * * *